United States Patent
Samonides, Sr.

[11] Patent Number: 6,066,688
[45] Date of Patent: *May 23, 2000

[54] ADHESIVE FOR LABELS AND THE LIKE

[75] Inventor: John Samonides, Sr., Streamwood, Ill.

[73] Assignee: X-Cal Corporation, Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/726,848

[22] Filed: Oct. 4, 1996

Related U.S. Application Data

[63] Continuation of application No. 08/567,872, Dec. 6, 1995, abandoned, which is a continuation of application No. 08/391,624, Feb. 22, 1995, abandoned, which is a continuation of application No. 08/065,626, May 21, 1993, abandoned.

[51] Int. Cl.[7] ........................................ C08L 93/04
[52] U.S. Cl. ............................. 524/272; 524/270
[58] Field of Search .................... 524/270, 271, 524/272, 274

[56] References Cited

U.S. PATENT DOCUMENTS

| | | | |
|---|---|---|---|
| 4,018,732 | 4/1977 | Lakshmanan | 524/270 |
| 4,068,028 | 1/1978 | Samonides | 428/40 |
| 4,280,942 | 7/1981 | Green | 524/271 |
| 4,681,909 | 7/1987 | Ohta et al. | 524/272 |
| 5,216,064 | 6/1993 | Rivera et al. | 524/272 |

FOREIGN PATENT DOCUMENTS

WO 91/16025  10/1991  WIPO.

*Primary Examiner*—Peter A. Szekely

[57] ABSTRACT

A water-based adhesive composition includes a water based acrylic adhesive emulsion and a tackifier. The adhesive has about 70 percent by weight of solids before drying. There is also provided a method for making an adhesive coated substrate which includes blending a water based acrylic adhesive emulsion with the tackifier to provide an aqueous composition which has above about 70 percent by weight of solids and above about 20 percent by weight of water. The composition is extruded onto a substrate moving at high speed and is cured.

3 Claims, No Drawings

6,066,688

ADHESIVE FOR LABELS AND THE LIKE

RELATED PATENT APPLICATIONS

This application is a continuation of U.S. patent application Ser. No. 567,872, filed Dec. 6, 1995, now abandoned, which is a continuation of U.S. patent application Ser. No. 391,624, filed Feb. 22, 1995, and now abandoned.

This application is a file wrapper continuation of U.S. patent application Ser. No. 391,624, filed Feb. 22, 1995 now abandoned, which is a file wrapper continuation of U.S. patent application Ser. No. 065,626, filed May 21, 1993 now abandoned.

TECHNICAL FIELD

The present invention generally relates to an adhesive. More particularly, the invention relates to an adhesive which is particularly suited for applying labels or the like. Specifically, the present invention relates to an adhesive composition having a uniquely high percentage of solids, such that the resulting adhesive, when applied to a label, does not require heat in order for the composition to dry. Furthermore, the adhesive is applied at substantially its set thickness.

BACKGROUND OF THE INVENTION

It is known in the art to prepare preprinted pressure sensitive adhesive backed labels which have a transparent protective face (see, for example, U.S. Pat. No. 4,068,028, issued Jan. 10, 1978). In making such labels it is common to use water based adhesives and more particularly water based acrylic emulsion adhesives. Such label and tag making adhesives are normally applied in a liquid state containing 40% or more water or other liquid vehicle. While this simplifies the application of the adhesive to the substrate the moisture must be subsequently removed to produce the final adhesive backed product.

For example, a pressure sensitive label containing from about 3–5% of moisture by weight depending on the operation such as wide web adhesive coating and laminating of label stock, usually intended for future conversions as sold through a paper merchant, is cured to approximately 3% moisture while normal label substrates may contain up to 5%. If the adhesive at the time of lamination contains 40% or more moisture by weight, that excess must be driven off in the production of the final adhesive backing When applying such emulsion adhesive containing 40% or more moisture either by free flow extrusion by Mayer Rod, a 36 Mayer Rod would apply about 8 mils of wet adhesive at about 56% solids and would cure out at about 0.0009–0.001 mils thickness dry at 120 feet per minute with three ten foot zoned ovens, starting heat 225° F. and ending heat 425° F. Such wet emulsion adhesive application or coating at even high speeds of 800–1000 feet per minute or faster would require even more time and heat for curing. Moreover they require a tremendous amount of energy to dry the vehicle which is between 50–60% water.

On the other hand, hot melt adhesives may be extruded at high speeds onto substrates and cured in a very short time. Such material, however, requires expensive equipment for application and the use of considerable energy to melt the hot melt pellets and apply them in proper consistency. Such operations are expensive and time consuming and may even involve referring the product to an outside organization to apply the adhesive and dry it to a level satisfactory for the making of the label. This invention overcomes these difficulties and provides an adhesive with low moisture content which may be extruded on to a substrate and used almost immediately.

SUMMARY OF THE INVENTION

The water based acrylic adhesives of this invention are highly desirable as pressure sensitive adhesives in making labels, tags and the like. See for example, International PCT Patent Application No. PCI/US 91/02609, published Oct. 31, 1992, No. WO 91/16025, wherein is disclosed methodology for the production of pressure sensitive labels using water based acrylic adhesives. Such adhesives are particularly desirable when the water content is within twenty-five percentage points of the final moisture content of the product by weight, generally in the area of 5–10%. Such adhesives are normally extruded and at the time of extrusion should have no more than 30% moisture by weight and preferably around 10–20% moisture by weight so that the water present in the adhesive can be absorbed into the paper of the label stock or to a paper backing or release material in its substantial totality while providing a suitable label stock according to standards for such materials. With such an adhesive, no outside drying of the water from the adhesive is required but rather substantially all of the water is absorbed into the paper face stock and release paper. Further, the water is absorbed into the paper substrates at a sufficiently high rate so as to permit almost instantaneous printing and die cutting of the so formed roll label laminate.

In other words the processing advantage is the provision of an adhesive having processable viscosities containing only water as the liquid and in which the amount of water present in the formula can be absorbed into the paper of the label stock substantially in its totality while providing a suitable label stock according to standards for such materials. Such a pressure sensitive adhesive should require approximately 3-plus points to tear fiber from a paper pressure sensitive label upon removal.

DETAILED DESCRIPTION OF THE PREFERRED EMBODIMENT

The pressure sensitive water based adhesives of this invention rely for their tackiness on acrylate polymers. The basis of pressure sensitive acrylic adhesives is acrylic esters which yield polymers of low glass transition temperatures (Tg) and can be copolymerized with acrylic acid and many other functional monomers in either emulsion or solution polymerization. Generally alkyl acrylates and methacrylates of 4–17 carbon atoms are suitable monomers for pressure sensitive adhesives. The most commonly used monomers are 2-ethylhexyl acrylate, butyl acrylate, ethyl acrylate and acrylic acid. Some nonacrylic monomers such as vinyl acetate are also used to modify the polymer properties or to decrease the cost of raw materials. In addition to these monomers many other compounds have been used in the synthesis of pressure sensitive acrylic adhesives. Some are used in substantial quantities, others in small amounts for some special effect related to the functional groups carried by such monomers. Almost any conceivable monomer that is capable of undergoing vinyl polymerization can be used. A random selection of these materials which is by no means complete includes methyl acrylate, ethyl acrylate, n-propyl acrylate, butyl acrylate, pentyl acrylate, dimethylaminoethyl diacrylate, 1,6-hexanediol diacrylate, diethylene glycol diacrylate, diethylene glycol triacrylate, trimethylol propane triacrylate, methyl methacrylate, butyl methacrylate, pentyl methacrylate, ethylene glycol dimethacrylate, 1,3-butylene glycol amide, trimethylamine acrylamide, trimethylamine methacrylamide, methacrylic acid, acrylonitrile and many other acidic materials. Of the vinyl compounds vinyl propionate, vinyl toluene, vinyl benzoate and sodium vinyl sulfonate are usable. Other materials such as vinyl ethers, allyl compounds, styrene derivatives, lactones, isocyanates and the like can be used. The acrylate adhesive of this invention contains such polymers in about 70% solids by weight of the adhesive with the remainder being the liquid or water carrier. Suitable adhesives may also be made wherein the water carrier comprises 40–50% by weight of the mixture.

In general, the present invention is directed toward a water-based adhesive composition which comprises from about 50 to about 80 parts by weight of a water-based acrylic adhesive emulsion; and, from about 50 to about 20 parts by weight of tackifier. The adhesive has above about 70 percent by weight of solids before drying.

The invention is also directed toward a method of making an adhesive coated substrate using a water-based acrylic adhesive particularly adapted for use in the preparation of pressure sensitive adhesive-backed substrates such as labels and the like. The method comprises the steps of blending from about 50 to about 80 parts by weight of a water-based acrylic adhesive emulsion with from about 50 to about 20 parts by weight of tackifier to provide an aqueous composition comprising above about 70 percent by weight of solids and above about 20 percent by weight of water before drying. The method also includes the steps of extruding the composition onto the substrate moving at high speed, and curing the composition.

It is desirable, however, that the content of the water in the adhesive be diminished to a point where the remaining or residual water can be absorbed by the label or its release operation. It is to achieve this purpose that the adhesive of this invention has been developed.

The low liquid/high solids nature of this invention makes it possible for it to be applied by extrusion, for example, at about 0.0011 mils thickness at about 150 feet per minute and cures out within about 5–7 feet without any heat being applied from an external heat source. The resulting thickness of the adhesive will be about 0.0008–0.0009 mils depending upon the starting base adhesive solids. When the milky appearance of the emulsion adhesive turns clear, cure has been accomplished and the substrate bearing the adhesive is ready for label manufacture.

Surprisingly, adhesive manufacturers currently operating in the United States and elsewhere have been unable to produce such an adhesive and have required various subsidiary operations to eliminate the water carrier and make the adhesive usable for one step, level label making methods. This most likely resulted because no one appreciated the advantages of adding substantial amounts of tackifier to provide a high solids low water content adhesive. It was universally thought that such an addition would detackify the adhesive. Such has proved not to be the case, however, and when large proportions of tackifiers are added to acrylic adhesives, according to the invention, the resultant high solids low liquid product is thoroughly useful in the extrusion of such adhesives onto substrates at high speeds. In some cases however, it may be desirable after the original blending of the adhesive with the tackifier to post blend additional amounts of tackifier to raise the adhesive solids content even higher.

Normal blending of tackifier with acrylic adhesives has resulted in solids contents ranging from 80–83% by weight which means the water content is quite low. Post blending of 10% by weight additional tackifier will now result in an adhesive in the range of 85% by weight solids. Such a water level content is extrudable in the one step operation since some of the water is driven off during the application by extrusion. The resultant water content is in the neighborhood of 5% by weight which can be readily absorbed by the materials that go into making the labels. That is, the labels which are preferably used with the present adhesive are paper or the like, which will absorb the moisture from the adhesive. Furthermore, the backing layer, which is applied to the label adhesive, may also be paper, which will also absorb water from the adhesive. It is a unique aspect of the present invention that substantially all of the water is absorbed from the adhesive in this manner, without the use of further dryers or the like. However, when the label is printed, dryers are usually employed with each printing station. The use of printing station dryers will result in even more moisture being removed from the label.

Other materials which can affect the moisture level and do provide some moisture control in the final adhesive include such things as humectants in small amounts, normally from one-half to two percent by weight of the compositions. Such humectants are normally a polyol such as glycerin, ethylene glycol, hexylene glycol, or propylene glycol. Flow control, which provides for a more smoothly applied adhesive during the extrusion process, is assisted or can be improved by the addition of a very small amount of a surfactant such as sodium sulfonate, in an amount of from one-quarter to two percent by weight of the composition. Lastly, small amounts of filler such as calcium carbonate or kaolin clay may be included and for color, titanium dioxide can be used or left out as the case may be if a clear adhesive is desired.

A wide range of pressure sensitive acrylate adhesives can be used in the composition of this invention so long as they are relatively high in moisture and relatively low in viscosity, although even those parameters can be varied widely. A particularly preferred acrylate adhesive which has been used in the composition of this invention is one that includes up to three percent of acrylic acid in the copolymer and up to 97% normal butyl acrylate with resulting solids between 50–70% that can be adjusted to approximately 65% while approximately 35% would be water. To those skilled in the art the use of such adhesives their blending, polymerization and adjustments are well known. Tackifiers which result in the desired moisture or water content are broadly such things as rosins, more particularly tall oil rosin. Tall oil is an oily resinous mixture of rosin acids, fatty acids, sterols, high molecular weight alcohols, unsaponifiable matter and colored and odoriferous material. The exact nature and proportion of the constituents vary widely and is not well known. These compositions have the effect of drying the mixture without adversely affecting the tackiness of the adhesive. However, it has been discovered that a more preferable resin for this purpose is one manufactured by Arizona Chemical and sold under the trademark AQUATAC 9041. This material is a resin which is a mixture of methyl and glycerol esters of abietic acid (sometimes called rosin acid) plus a slight excess of an anhydride such as maleic or fumaric. An excess of the carboxyl groups from the anhydrides permits the AQUATAC 9041 to be easily dispersed in alkaline water permitting the very high percentage of solids in the adhesive.

This material has a pH ranging from 8.37 to 8.58 and is about 90% by weight solids, has a softening point of 36–40° C. and a viscosity at 72° F. of $2 \times 10^{6+}$ cps or at 150° F. 5700 cps. Addition of this material into the formulation of the adhesive of this invention in its original blending results in an adhesive having the desired properties and a moisture or water content somewhere in the vicinity of 35–40% by weight which is decreased by the addition of other materials so that the resultant composition has a water content somewhere in the nature of 20% by weight. Thereafter post blending of a resin material such as AQUATAC 9041 may be used to raise the solids content to a point somewhere in the vicinity of 82–83% so that the water content of under 10–20% by weight can readily be handled in the label manufacturing operation. Following are examples of suitable adhesives made following the dictates of this invention:

| Components | % By Weight of Solids | Prts. By Weight of Whole | lbs | % By Weight of Whole | Actual Solids |
|---|---|---|---|---|---|
| Example 1 | | | | | |
| FLEXCRYL 1625[a] | 69 | 100.00 | 15.0 | 44.78 | 30.90% |
| AQUATAC 9041[c] | 90 | 90.00 | 13.5 | 40.30 | 36.60 |
| $TiO_2$ | 90 | 16.67 | 2.5 | 07.46 | 6.70 |
| $CaCo_3$ | 85 | 16.67 | 2.5 | 07.46 | 6.30 |
| Avg. % of Solids | 83.5 | 223.3 | 33.5 | 100.00 | 80.50% |
| Example 2 | | | | | |
| FLEXCRYL 1625[a] | 69 | 100.00 | 15.0 | 48.30 | 33.39% |
| AQUATAC 9041[c] | 90 | 90.00 | 13.5 | 43.55 | 39.19 |
| $CaCo_3$ | 85 | 16.67 | 2.5 | 8.06 | 7.00 |
| Avg. % of Solids | 81.33 | 206.67 | 31.0 | 100.00 | 79.58% |
| Example 3 | | | | | |
| GME 2397[b] | 65 | 100.00 | 5.0 | 18.75 | 12.2% |
| AQUATAC 9041[c] | 90 | 333.40 | 16.67 | 62.51 | 56.2 |
| $TiO_2$ | 95 | 50.00 | 2.5 | 9.37 | 8.9 |
| $CaCo_3$ | 100 | 50.00 | 2.5 | 9.37 | 9.4 |
| Avg. % of Solids | 87.5 | 533.40 | 26.67 | 100.00 | 86.7% |
| Example 4 | | | | | |
| GME 2397 | 65 | 100.00 | 6.0 | 26.67 | 17.33% |
| AQUATAC 9041[C] | 90 | 216.67 | 13.0 | 57.78 | 52.00 |
| $TiO_2$ | 95 | 50.00 | 3.0 | 13.33 | 12.67 |
| $CaCo_3$ | 100 | 8.33 | 0.5 | 2.22 | 2.22 |
| Avg. % of Solids | 87.5 | 375.00 | 22.5 | 100.00 | 84.22% |

[a]poly (ethylhexyl acrylate) from Air Products, Inc.
[b]poly n-butyl acrylate from Monsanto
[c]mixture of methyl and glycerol esters of abietic acid from Arizona Chemical These examples show that an adhesive according to the present invention achieves a high solids content. After the original blending of both of these adhesives an additional 10% by weight or approximately four pounds of AQUATAC 9041 can be blended which further raises the solids content and decreases the water content. In adding the AQUATAC tackifier, it should be heated to approximately 150° F. and slowly blended into the base adhesive with a high torque, low speed mixer such as used in making caulking and the like to minimize air trappings and then allow to set for a few days so as any residual air will surface and be removed.

Another series of formulations were prepared according to amounts shown in TABLE I hereinbelow. The formulations were coated onto 1 mil mylar, at the coating thicknesses indicated. The coatings were then dried and tested for tack according to ASTM D 2979, for peel strength according to ASTM D 903-49, and shear resistance according to PSTC 7. The results of these tests are also reported in TABLE I hereinbelow.

TABLE I

PHYSICAL TEST RESULTS

2. Formulation
   GME2424        180 grms.
   AQUATAC 9041   170 grms.
   Properties: 1 mil Mylar

| Coat Wt. | PL20 | PL24 | CRPQ |
|---|---|---|---|
| 1.3 mils | 5.75C | 5.45C | 51 minutes |
| 2.0 mils | 4.5–7.0 z/c | 5.0–7-5 z/c | 51 minutes |

| | | Example No. | | |
|---|---|---|---|---|
| Component | % TS | 5 | 6 | 7 |
| GME 2504 | 61.5 | 6.9 | — | — |
| GME 2397 | 65.0 | — | 6.5 | 6.5 |
| AQUATAC 9041 | 90.0 | 4.0 | 4.0 | 6.0 |
| $TIo_2$ | 100.00 | — | — | — |
| $CaCo_3$ | 100.00 | — | — | — |
| TOTAL | | 10.9 | 10.5 | 12.5 |
| %TS | | 71.9 | 74.8 | 77.3 |
| VISCOSITY, cps @ 70 F | | 6400 | 12,800 | 12,800 |
| COAT WEIGHT-MILS | | | | |
| Wet - Extruded | | 0.97 | 0.96 | 1.10 |
| Dry (5 FT @ 90 C) - After drying | | 0.95 | 0.92 | 1.05 |
| Performance Results (1.0 mil Mylar/SS) | | | | |
| Tack (g/cm$^2$) | | | | |
| Dry(S) | | 857(61) | 641(118) | 619(133) |
| Wet(S) | | 852(43) | 872(111) | 1151(165) |
| 20' Peel (lbs/linear inch | | | | |
| Dry | | 5.2C | 3.0A/C | 4.4C |
| Wet | | 5.0C | 3.0C | 4.0C |
| 24 Hr Peel lbs/linear inch | | | | |
| Dry | | 4.7C | 2.7A/C | 5.4C |
| Wet | | 4.6C | 3.9C | 4.9C |
| Shear (lb/0.25 in. Sq.) | | | | |
| Dry | | 0.7C | 2.5C | 2.0C |
| Wet | | 0.4C | 1.9C | 1.1C |

A = Adhesive Failure Mode
C = Cohesive Failure Mode

Example 5 was coated at 0.97 mil and dried at 0.95 mil; Example 6 at 0.96 mil and dried at 0.92 mil; and Example 7 at 1.10 mil and dried at 1.05 mil. This data shows that the adhesive is coatable at substantially its dry thickness. Hence, the adhesive may be said to be a "cold melt" as opposed to a hot melt adhesive.

Furthermore, the tack, peel and shear tests show that the present invention is useful in carrying out the objects of the invention. A uniquely high solids adhesive composition is obtained, with useful physical properties as a label adhesive.

The blending of the AQUATAC 9041 may be supplemented by other materials such as tall oil rosin, according to the desires of the compounder, it mainly being important that the water carrier level be decreased sufficiently so that the moisture is eliminated in the label making operation.

Various features of the invention have been particularly shown and described in connection with the illustrated embodiment of the invention, however, it must be understood that these particular arrangements merely illustrate and that the invention is to be given its fullest interpretation within the terms of the appended claims.

Thus it should be evident that the adhesive composition method of the present invention is highly effective in providing a high solids composition. The invention is particularly suited for use as a labeling adhesive, but is not necessarily limited thereto. The compositions and methods of the present invention can be used separately with other equipment, methods and the like.

Based upon the foregoing disclosure, it should now be apparent that the use of the adhesive composition described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the adhesive base, tackifiers and other additives according to the present invention are not necessarily limited to those discussed. Thus, the scope of the invention shall include all modifications and variations that may fall within the scope of the attached claims.

What is claimed is:

1. A water-based adhesive composition comprising a mixture consisting of from about 50 to about 80 parts by weight of a water-based acrylic adhesive emulsion;

and from about 50 to 20 parts by weight of tackifier;

wherein both said adhesive composition and said mixture have above about 70 percent of solids before drying.

2. An adhesive composition as in claim 1, wherein said tackifier is selected from the group consisting of tall oil rosin, and a mixture of methyl and glycerol esters of abietic acid.

3. An adhesive composition as in claim 2, wherein said mixture of methyl and glycerol esters of abietic acids also includes an excess of an anhydride selected from the group consisting of maleic and fumaric.

* * * * *